(12) United States Patent
Tsukano et al.

(10) Patent No.: US 9,080,637 B2
(45) Date of Patent: Jul. 14, 2015

(54) DYNAMIC DAMPER

(75) Inventors: Fusahiro Tsukano, Susono (JP);
Hiroyuki Amano, Susono (JP);
Shinichiro Suenaga, Susono (JP); Yu Miyahara, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 248 days.

(21) Appl. No.: 13/637,485

(22) PCT Filed: Apr. 14, 2010

(86) PCT No.: PCT/JP2010/056654
§ 371 (c)(1),
(2), (4) Date: Sep. 26, 2012

(87) PCT Pub. No.: WO2011/128988
PCT Pub. Date: Oct. 20, 2011

(65) Prior Publication Data
US 2013/0014609 A1    Jan. 17, 2013

(51) Int. Cl.
*F16F 15/14* (2006.01)

(52) U.S. Cl.
CPC ......... *F16F 15/1457* (2013.01); *Y10T 74/2128* (2015.01)

(58) Field of Classification Search
CPC . F16F 15/145; F16F 15/1457; F16F 15/1407; F16F 15/1442; F16F 15/30; F16H 2045/0263; F16H 2055/366; Y10T 74/2128; Y10T 74/213; Y10T 74/2131; Y10T 74/2121; Y10T 74/2114; Y10T 74/2112
USPC ............. 74/574.2–574.4, 572.2, 572.21, 604, 74/570.1; 188/378–379; 416/145
See application file for complete search history.

(56) References Cited

U.S. PATENT DOCUMENTS 2,379,255 A * 6/1945 Rubissow .................... 74/574.3
5,351,574 A    10/1994 Hiraishi et al.

FOREIGN PATENT DOCUMENTS

| GB | 516574 A * | 1/1940 | ............. F16F 15/14 |
| JP | 6 58373 | 3/1994 | |
| JP | 11 82633 | 3/1999 | |
| JP | 2000 18329 | 1/2000 | |
| JP | 2000-18329 A | 1/2000 | |

(Continued)

OTHER PUBLICATIONS

International Search Report Issued May 18, 2010 in PCT/JP10/56654 Filed Apr. 14, 2010.

*Primary Examiner* — Marcus Charles
*Assistant Examiner* — Yamilka Pinero Medina
(74) *Attorney, Agent, or Firm* — Oblon, McClelland, Maier & Neustadt, L.L.P.

(57) ABSTRACT

A dynamic damper for attenuating torsional vibration of a rotary member, in which a weighted center of a rolling member is offset from a geometric center to trace an elliptical orbit of a cycloid pendulum. The dynamic damper including, a housing having a rolling surface on its inner surface is formed in a rotary member, and a rolling member held in the housing in a manner to be rolled on the rolling surface by torque pulse exerted on the rotary member. In the dynamic damper, a curvature of the rolling surface is entirely constant, and a radius of the rolling member is smaller than that of the rolling surface. A weighted center of the rolling member is offset from a geometric center thereof. The rolling member is guided by a guiding mechanism to roll on the rolling surface.

2 Claims, 14 Drawing Sheets

(56) References Cited

FOREIGN PATENT DOCUMENTS

| JP | 2000 297843 | 10/2000 |
|----|-------------|---------|
| JP | 2000 297844 | 10/2000 |
| JP | 2001 153185 | 6/2001 |
| JP | 2002 372102 | 12/2002 |

* cited by examiner

DYNAMIC DAMPER

TECHNICAL FIELD

The present invention relates to a dynamic damper arranged in a rotary member to absorb or attenuate torsional vibrations of the rotary member resulting from torque pulse.

BACKGROUND ART

Resonance resulting from torque pulse exerted on a rotary member will amplify noises and vibrations of machineries. Moreover, resonance will deteriorate durability of the machineries. For example, a crankshaft of an internal combustion engine is adapted to convert a linear reciprocating motion achieved by explosions in cylinders into rotation. Therefore, torque pulse appears inevitably on the crankshaft. For this reason, the crank shaft, an input shaft and a drive shaft of a transmission, a rotary member integrated with those shafts etc. are subject to torsional vibrations. In order to absorb or attenuate the torsional vibrations, a dynamic damper may be arranged in the rotary member. An example of the dynamic damper of this kind is disclosed in Japanese Patent Laid-Open No. 2000-18329. According to the teachings of Japanese Patent Laid-Open No. 2000-18329, a damper mass having a predetermined weight is held within a housing formed in a flywheel, and an ellipsoidal rolling guide surface on which the damper mass rolls is formed on radially outer portion of an inner face of the housing.

Another example is disclosed in Japanese Patent Laid-Open No. 6-58373. The flywheel taught by Japanese Patent Laid-Open No. 6-58373 comprises a rolling chamber formed in the flywheel, and a damper mass held in the rolling chamber. The damper mass is rolled in the rolling chamber by the torque pulse exerted on the flywheel.

In addition, Japanese Patent Laid-Open No. 11-82633 discloses a damper in which a pendulum assembly is fitted into a cylindrical recess formed on a surface of a flywheel. The pendulum assembly comprises a bottomed cylindrical casing whose center axis is parallel to a rotation axis of the flywheel, and a pendulum held by a bearing in a manner to pivot around the center axis of the casing. A weighted center of the pendulum is offset from the center axis of the casing.

By forming the rolling guide surface into an ellipsoidal shape as taught by Japanese Patent Laid-Open No. 2000-18329, a weighted center of the damper mass is allowed to trace an ellipsoidal hypocycloid. The damper thus structured can absorb or attenuate the torsional vibrations of the flywheel irrespective of magnitude of the torsional vibrations. However, in order to roll the dumper mass in a manner to trace the ellipsoidal hypocycloid by the weighted center as taught by Japanese Patent Laid-Open No. 2000-18329, it is necessary to form the rolling guide surface into the ellipsoidal shape. Therefore, a complex working is required to form the ellipsoidal guide surface on the housing in comparison with forming a curved face whose curvature is constant. Thus, the damper of by Japanese Patent Laid-Open No. 2000-18329 has to be improved.

Specifically, the flywheel taught by Japanese Patent Laid-Open No. 6-58373 is structured to absorb or attenuate the torsional vibrations resulting from torque pulse exerted thereon by a displacement of the weighted center of the damper mass, that is, by a pendulum motion of the damper mass. Meanwhile, the damper taught by Japanese Patent Laid-Open No. 11-82633 is formed by suspending the pendulum assembly comprising a mass pivotally from the rotation center of the casing through the bearing. Therefore, the pendulum assembly is oscillated by the torque pulse thereby absorbing or attenuating the torsional vibrations.

DISCLOSURE OF THE INVENTION

The present invention has been conceived noting the technical problems thus far described, and its object is to provide a dynamic damper for attenuating torsional vibration of a rotary member resulting from torque pulse by oscillating the weighted center of the rolling member partially along a specific orbit of a cycloid pendulum.

According to the dynamic damper of present invention, a housing having a rolling surface on its inner surface is formed in a rotary member, and a rolling member is held in the housing in a manner to be rolled on the rolling surface by torque pulse exerted on the rotary member. In order to achieve the above-mentioned object, according to the dynamic damper of present invention, a curvature of the rolling surface is entirely constant. A cross-section of the rolling member is a circular shape whose curvature radius is smaller than that of the rolling surface, and a weighted center of the rolling member is offset from a geometric center of the rolling member in a manner to be situated between a center of curvature of the rolling surface and the geometric center of the rolling member, in case the weighted center of the rolling member comes closest to the center of curvature of the rolling surface. The dynamic damper further comprises a guiding mechanism that guides the rolling member to roll on the rolling surface.

The aforementioned the guiding mechanism includes: a pin, which is attached to an outer circumferential edge of the rolling member to protrude in an axial direction of the rotary member, or which is formed on a lid parallel to a surface of the rotary member to protrude in an axial direction of the rotary member; and a guide groove to which the pin is fitted loosely, and which is formed on the lid or the rotary member.

More specifically, according to the present invention, there is provided a dynamic damper, comprising: a housing, which is formed in a rotary member; a rolling surface, which is formed on an inner surface of the housing; and a rolling member, which is held in the housing in a manner to be rolled on the rolling surface by torque pulse exerted on the rotary member. The dynamic damper thus structured is characterized in that: a ratio of an outer diameter of the rolling member to an inner diameter of the housing is 1:2; the weighted center of the rolling member is offset from the geometric center of the rolling member in a manner to be situated between the a center of curvature of the rolling surface and the geometric center of the rolling member, in case the weighted center of the rolling member comes closest to the center of curvature of the rolling surface; and the dynamic damper further comprises a guiding mechanism, which extends in a direction perpendicular to a line passing through the center of curvature of the rolling surface and the weighted center of the rolling member situated at a position where the weighted center comes closest to the center of curvature of the rolling surface.

Thus, according to the present invention, the weighted center of the rolling member is offset from the geometric center thereof, and the guiding mechanism is adapted to guide the rolling member to roll on the rolling surface. Therefore, the rolling member is allowed to roll on the rolling surface without causing a slippage. A traveling distance, in other words, an oscillation range of the rolling member rolling on the rolling surface having a constant curvature is increased in accordance with an increase in amplitude of the torsional vibration resulting from torque pulse exerted on the rotary member. Therefore, the weighted center of the rolling member is allowed to trace a particular orbit of a cycloid pendulum with an increase in the oscillation angle thereof so that the dynamic dumber serves as a cycloid pendulum. An oscillation frequency of the rolling member thus oscillates as the cycloid pendulum may be determined without taking into consideration the oscillation angle θ of the rolling member. Moreover, the actual oscillation frequency of the rolling member per revolution will not deviate significantly from the designed oscillation frequency per revolution even if the oscillation range of the rolling member is increased. In addition, the rolling member is tuned to equalize the oscillation frequency thereof per revolution with the torque pulse frequency per revolution exerted on the rotary member. Therefore, the torsional vibrations of the rotary member can be attenuated by the pendulum motion of the rolling member even if the rolling member is oscillated widely. Further, as described, the rolling member is allowed to roll on the rolling surface without causing slippage by the guiding mechanism.

As also described, according to the present invention, the weighted center of the rolling member is offset from the geometric center of the rolling member in a manner to be situated between the center of curvature of the rolling surface and the geometric center of the rolling member, in case the weighted center of the rolling member comes closest to the center of curvature of the rolling surface. In other words, the weighted center of the rolling member is offset from the geometric center of the rolling member in a manner to be closer to the center of curvature of the rolling surface than the geometric center thereof, in case the weighted center of the rolling member comes closest to the center of curvature of the rolling surface. Therefore, the curvature radius of the cycloid orbit traced by the weighted center of the rolling member is reduced gradually in accordance with an increase in a travelling distance of the rolling member. That is, the weighted center of the rolling member is allowed to partially trace the elliptical particular orbit of the cycloid pendulum. Therefore, the torsional vibrations of the rotary member resulting from torque pulse can be attenuated by the dynamic damper according to the present invention irrespective of the amplitude of the torsional vibrations.

In addition, according to the present invention, the dynamic damper further comprises the guiding mechanism. Specifically, the guiding mechanism is formed by the pin attached to an outer circumferential edge of the rolling member or formed on the lid parallel to a surface of the rotary member, and the guide groove to which the pin is fitted loosely and which is formed on the lid or the rotary member. Therefore, the rolling member is allowed to roll on the rolling surface under the situation in which the torsional vibrations resulting from torque pulse are exerted on the rotary member without causing a slippage therebetween. Therefore, the rolling member is allowed to oscillate at the designed frequency to attenuate the torsional vibration of the rotary member by the pendulum motion thereof.

According to the main embodiment of the present invention, the ratio of the outer diameter of the rolling member to the inner diameter of the housing is 1:2. In this case, the guiding mechanism is formed to extend in the direction perpendicular to the line passing through the center of curvature of the rolling surface and the weighted center of the rolling member situated at the position where the weighted center comes closest to the center of curvature of the rolling surface. That is, the guiding mechanism is formed along the hypocycloid of the pin attached to the rolling member. Therefore, design and working to form the guiding mechanism can be simplified. In this case, the curvature radius of the rolling surface formed in the housing is also entirely constant, and the weighted center of the rolling member is also offset from the geometric center of the rolling member. Therefore, the weighted center of the rolling member is allowed to partially trace the particular elliptical orbit of the cycloid pendulum in accordance with an increase in the oscillation angle of the rolling member. That is, the dynamic damper of the present invention is allowed to serve as the cycloid pendulum, and the oscillation frequency of the rolling member may be determined without taking into consideration the oscillation angle θ of the rolling member. For this reason, the actual oscillation frequency of the rolling member per revolution will not deviate significantly from the designed oscillation frequency per revolution even if the oscillation range of the rolling member is increased. In addition, the rolling member is tuned to equalize oscillation frequency thereof per revolution with the torque pulse frequency per revolution exerted on the rotary member. Therefore, the torsional vibrations of the rotary member can be attenuated by the pendulum motion of the rolling member even if the rolling member is oscillated widely. Further, as described, the rolling member is allowed to roll on the rolling surface without causing slippage by the guiding mechanism.

BEST MODE FOR CARRYING OUT THE INVENTION

Figure 1:
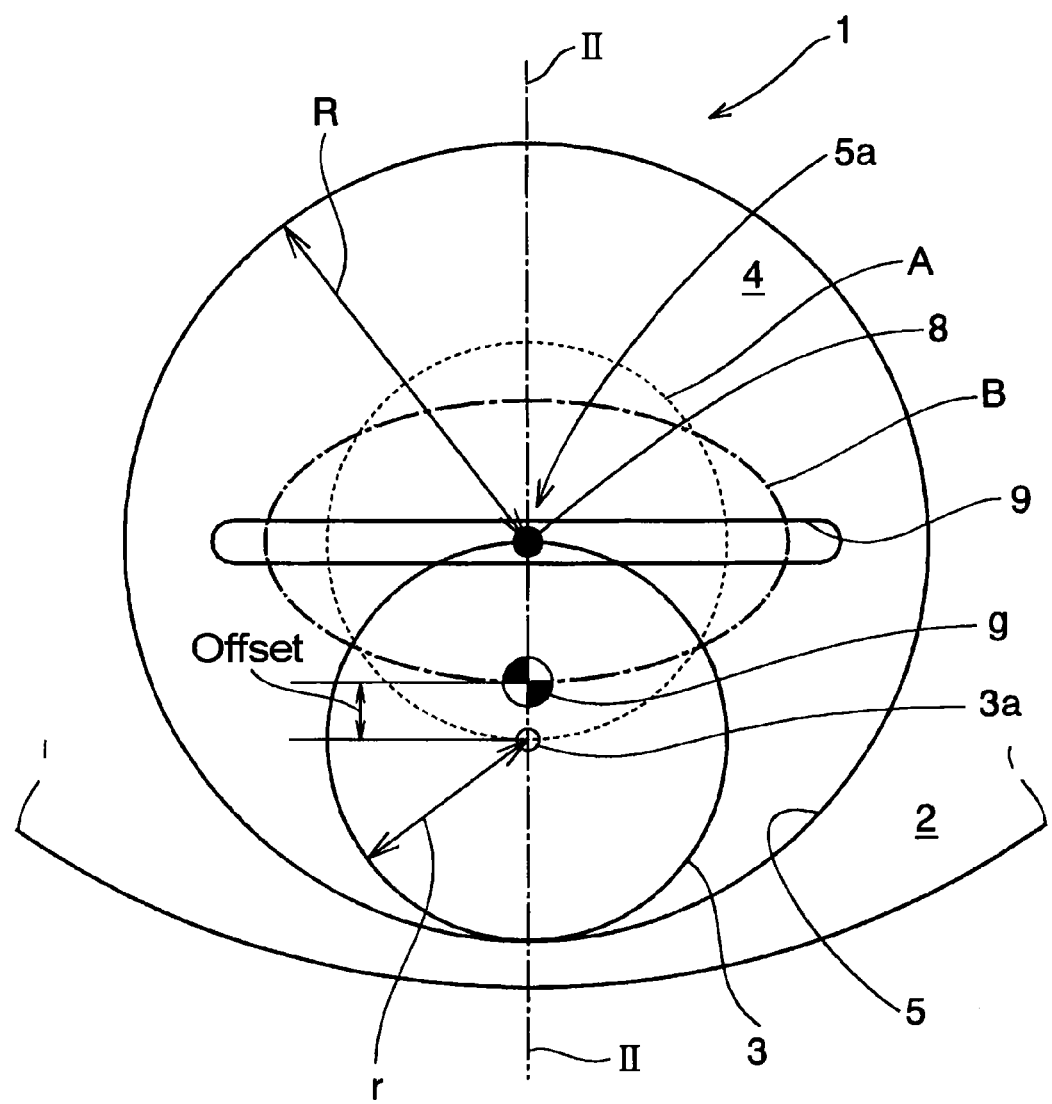
FIG. 1 is a front view schematically showing the dynamic damper of the present invention arranged in the rotary member.

Next, the present invention will be explained in more detail. The present invention relates to a dynamic damper arranged in a rotary member to absorb and attenuate torsional vibrations of a rotary member resulting from torque pulse. Specifically, the dynamic damper is arranged in an engine crank shaft of a vehicle, an input shaft of a transmission, a driveshaft, or a rotary member mounted on those rotary shafts to be rotated integrally therewith. According to the present invention, a rolling member functioning as a damper mass is arranged in the rotary member, and the rolling member oscillates in a direction opposite to a rotational direction of the rotary member when the torsional vibration resulting from torque pulse appears on the rotary member. In order to hold the rolling member, a housing comprising a rolling surface whose curvature is entirely constant is formed in the rotary member. For example, a ball member or a column-shaped rolling member can be used as the rolling member that rolls on the rolling surface to counteract torsional vibration of the rotary member. Thus, the rolling member is adapted to absorb or attenuate torsional vibration of the rotary member by the pendulum motion thereof achieved by the torsional vibrations resulting from torque pulse exerted on the rotary member. For this purpose, the rolling member is tuned to equalize an oscillation frequency thereof per revolution with a torque pulse frequency of the rotary member per revolution.

According to the present invention, a weighted center of the rolling member is offset from a geometric center thereof. For example, the weighted center of the rolling member can be displaced by arranging a weight at a desired portion, by cutting a portion of the rolling member, or by thickening a predetermined portion of the rolling member while thinning a diametrically opposite portion. Thus, the weighted center of the rolling member can be displaced by any suitable means.

In case the rolling member is situated at a neutral position, the weighted center of the rolling member comes closest to a center of curvature of the rolling surface. In this situation, the geometric center is situated outside of the weighted center in a radial direction of the housing. Specifically, the weighted center of the rolling member is offset from the geometric center thereof in a manner to trace an elliptical orbit by the weighted center when the rolling member rolls on the rolling surface. For this purpose, a distance between the weighted center and the geometric center of the rolling member is determined based on an experimental result.

Thus, the distance between the weighted center of the rolling member and the center of curvature of the rolling surface is varied continuously in accordance with the travelling distance of the rolling member. Specifically, a curvature radius of the cycloid orbit of the weighted center of the rolling member is shortened according to an increase in an oscillation range of the rolling member. That is, at least a portion of the cycloid orbit of the weighted center of the rolling member is ellipsoidal.

According to the dynamic damper thus structured, the rolling member is rolled on the rolling surface by the torsional vibrations resulting from torque pulse exerted on the rotary member. As described, the curvature of the rolling surface is entirely constant, however, the weighted center of the rolling member is offset from the geometric center thereof. Therefore, the weighted center of the rolling member is allowed to partially trace the particular ellipsoidal orbit of the cycloid pendulum so that the dynamic damper serves as the cycloid pendulum. The oscillation frequency of the rolling member thus structured may be determined without taking into consideration the oscillation angle θ of the rolling member. In addition, the oscillation frequency of the rolling member per revolution will not deviate significantly from the torque pulse frequency per revolution even if the oscillation range of the rolling member is increased. For this reason, the dynamic damper can attenuate the torsional vibrations resulting from torque pulse by a pendulum motion of the rolling member irrespective of the oscillation angle θ of the rolling member. According to the present invention, therefore, vibration dampening performance of the dynamic damper can be improved by thus offsetting the weighted center of the rolling member from the geometric center thereof.

In addition, in order to roll the rolling member on the rolling surface without causing a slippage therebetween, the dynamic damper of the present invention further comprises a guiding mechanism. Specifically, the guiding mechanism includes a pin attached to a predetermined portion on an outer circumferential edge of the rolling member, and a guide groove extending along a hypocycloid of the pin to which the pin is inserted. Alternatively, the pin may also be formed on an inner face of a lid closing the housing to protrude toward the rolling member, and in this case, the guide groove is formed on the surface of the rolling member. Therefore, the oscillation range of the rolling member on the rolling surface can be restricted within a desired range by setting a length of the guide groove to a desired length. By thus arranging the guiding mechanism, the rolling member is allowed to roll on the rolling surface without causing a slippage therebetween at the desired oscillation frequency. In addition, by thus restricting the oscillation range of the rolling member on the rolling surface, the rolling member is kept radially outside of the guiding mechanism in the housing. Therefore, large moment of inertia will act on the rolling member. Thus, the rolling member is allowed to oscillate within the range determined by the guiding mechanism.

FIG. 1 is a front view showing an example of applying the dynamic damper of the present invention to a rotary member. The rotary member 2 is rotated by the torque applied thereto, and as shown in FIG. 1, the dynamic damper 1 is arranged in the rotary member 2 to attenuate vibrations of the rotary member 2. Specifically, a cylindrical housing 4 is formed radially outer side in the rotary member 2, and a rolling surface 5 is formed on an inner face of the housing 4. A center axis of the housing 4 is parallel to a rotation center axis of the rotary member 2. A curvature of the rolling surface 5 is entirely constant so that the center of curvature 5a of the rolling surface is situated at the center of the housing 4, and a column-shaped rolling member 3 is held in a radially outer side in the housing 4. The ratio of an outer diameter r of the rolling member 3 to an inner diameter R of the housing 4 is 1:2, and an axis passing through a geometric center 3a of the rolling member is also parallel to the rotation center axis of the rotary member 2. The rolling member 3 is used to attenuate torsional vibrations of the rotary member 2 by a pendulum motion thereof. For this purpose, the rolling member 3 is tuned to equalize number of oscillation thereof per revolution with number of torque pulse exerted on the rotary member per revolution.

A weighted center g of the rolling member 3 is eccentrically offset predetermined distance away from the geometric center 3a thereof. The weighted center g can be offset from the geometric center 3a by arranging a mass at a desired portion of the rolling member 3, by cutting a portion of the rolling member 3, or by thickening a predetermined portion of the rolling member 3 while thinning a diametrically opposite portion. Specifically, as shown in FIG. 1, when the rolling member 3 is situated at the radially outermost position of the rotary member 2 in the housing 4, the weighted center g is situated closer to the center of curvature 5a of the rolling surface than the geometric center 3a thereof. Specifically, the weighted center g of the rolling member 3 is offset from the geometric center 3a thereof in a manner to allow the weighted center g to trace an elliptical cycloid orbit by a rolling motion of the rolling member 3 along the rolling surface 5 whose curvature is entirely constant. For this purpose, a distance between the weighted center g and the geometric center 3a is determined based on an experimental result.

Figure 2:
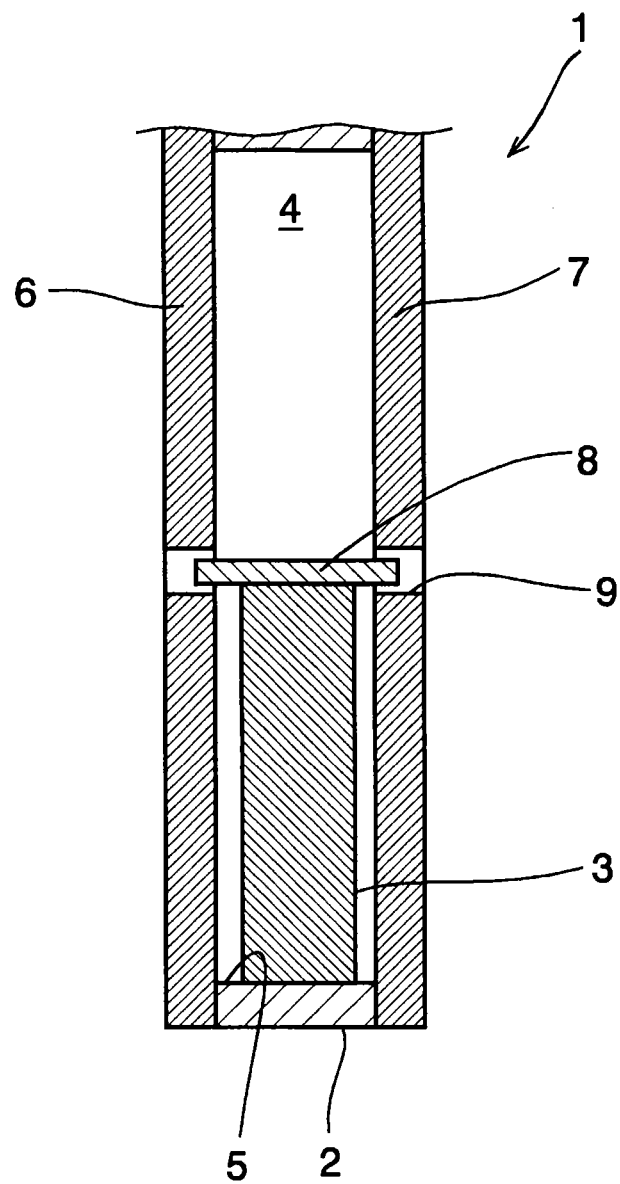
FIG. 2 is a cross-sectional view along II-II line shown in FIG. 1.

FIG. 2 is a sectional view showing a cross-section of the dynamic damper 1 along II-II line in FIG. 1. In the example shown in FIG. 2, an opening of the hollow hosing 4 is closed by lid members 6 and 7 from both sides, and both of those lid members 6 and 7 are integrated with the rotary member 2. Instead, it is also possible to form the housing 4 into a bottomed cylindrical shape and to close the opening thereof by a lid member.

A pin 8 is attached to an outer circumferential edge of the rolling member 3 in a manner to protrude in an axial direction of the rotary member 2, and a guide groove 9 to which the pin 8 is inserted loosely is formed on each of an inner face of the lid member 6 and 7 being opposed to the housing 4. Alternatively, the guide groove 9 may also be formed in a manner to penetrate through the lid members 6 and 7. The weighted center g of the rolling member 3 comes closest to the center of curvature 5a of the rolling surface 5 in the radial direction of the rotary member 2 when the rolling member 3 is situated at the neutral position. According to the example shown in FIG. 1, the pin 8 is attached to the outer circumferential edge of the rolling member 3 at the portion to be situated at the center of curvature 5a of the rolling surface 5 under the condition in which the rolling member 3 is situated at the neutral position. Therefore, the pin 8 traces a hypocycloid by rolling the rolling member 3 along a diameter of the rolling surface 5 in a direction perpendicular to a line passing through the center of the rotary member 2 and the center of curvature 5a of the rolling surface. In order to guide the pin 8 thus moved, according to the example shown in FIG. 1, the guide groove 9 is formed along the hypocycloid of the pin 8 in a predetermined length. By thus guiding the pin 8 by the guide groove 9, the rolling member 3 is allowed to roll on the rolling surface 5 without causing slippage.

According to the example shown in FIG. 1, a range of pendulum motion of the rolling member 3 on the rolling surface 5 can be restricted by adjusting a length of the guide groove 9. In addition, the rolling member 3 is kept within the radially outer side of the rotary member 2 in the housing 4 by the guiding mechanism thus structured. Therefore, the rolling member is oscillated by the torsional vibrations exerted on the rotary member 2 within the range thus restricted by the guiding mechanism. In FIG. 1, a dotted line "A" represents a cycloid orbit of the geometric center 3a to be traced by rolling the rolling member 3 on the rolling surface 5, and a dashed-dotted line "B" represents a cycloid orbit of the weighted center g to be traced by rolling the rolling member 3 on the rolling surface 5.

Figure 3:
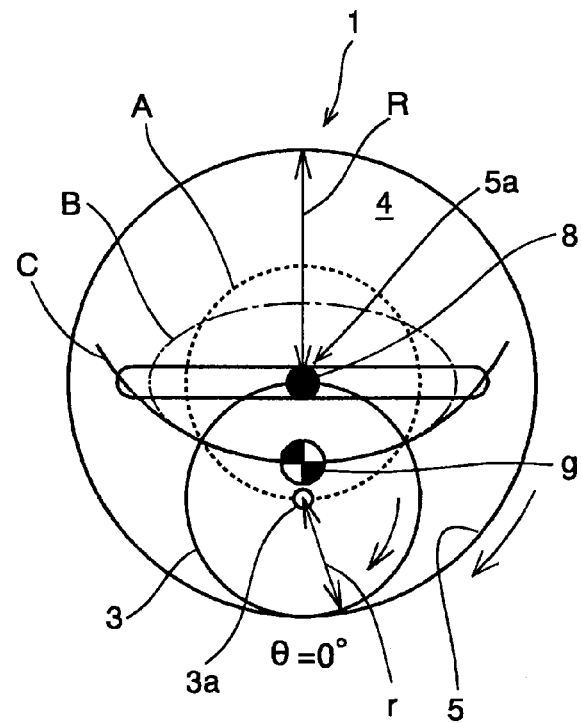
FIG. 3 is a view showing a situation in that the oscillation angle of the rolling member is zero.
Figure 4:
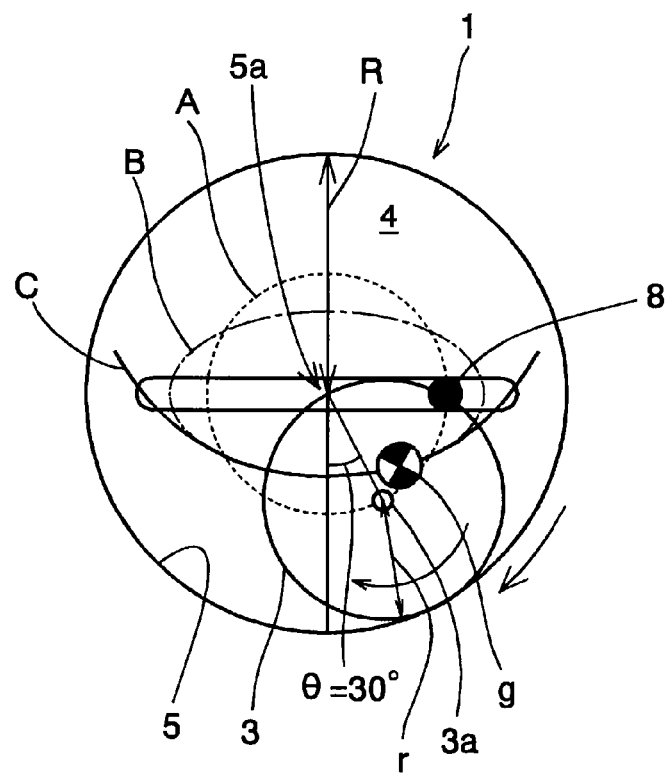
FIG. 4 is a view showing a situation in that the oscillation angle of the rolling member is 30 degree.
Figure 5:
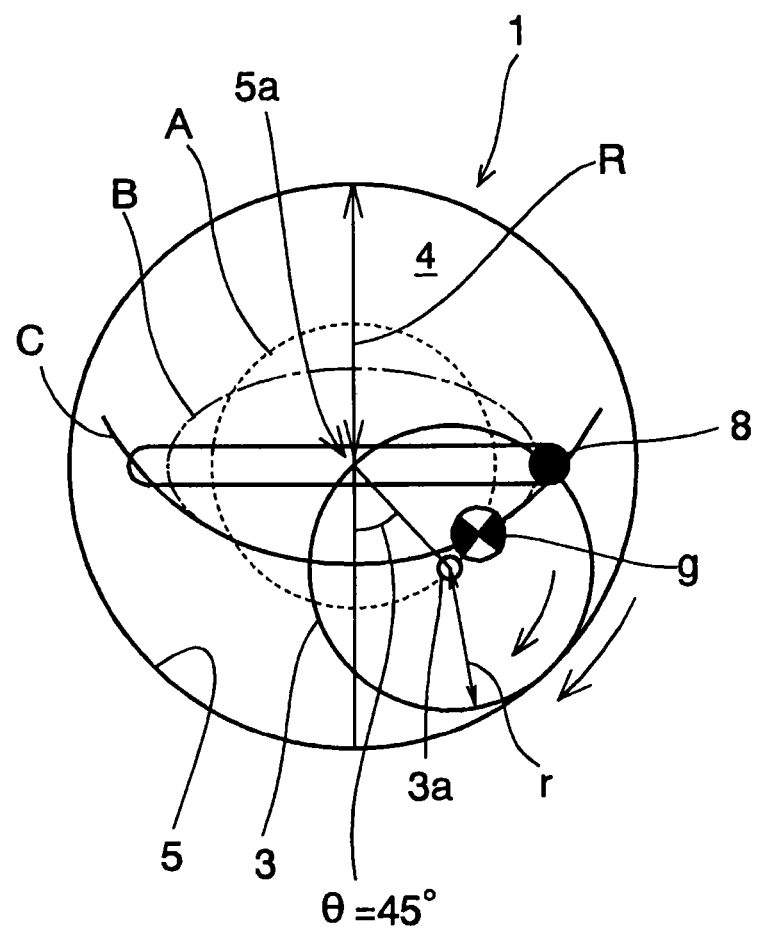
FIG. 5 is a view showing a situation in that the oscillation angle of the rolling member is 45 degree.

Next, an action of the dynamic damper of the present invention thus structured will be explained hereinafter. FIGS. 3, 4 and 5 schematically illustrate a movement of the rolling member 3 under the situation in which the torsional vibrations resulting from torque pulse are exerted on the rotary member 2. When the dynamic damper 1 in the rotary member 2 is started to be rotated, a centrifugal force starts acting on the rolling member 3 in the housing 4. The centrifugal force acting on the rolling member 3 is increased with an increase in the rotational speed of the rotary member 2. When the centrifugal force acting on the rolling member 3 exceeds gravitational force acting on the rolling member 3, the rolling member 3 is moved radially outwardly in the housing 4. In this situation, if the torque pulse is not exerted on the rolling member 2, an oscillation angle (or oscillation range) θ is zero, and the rolling member 3 is situated at the outermost point in the housing 4 as shown in FIG. 3.

When the rotational speed of the rotary member 2 in which the dynamic damper 1 is arranged is changed, or when the torque pulse is exerted on the rotary member 2, the rolling member 3 rolls on the rolling surface 5 in the direction opposite to the rotational direction of the rotary member 2. A travelling distance of the rolling member 3, that is, the oscillation angle θ of the rolling member 3 is varied in accordance with an amplitude of the torsional vibration resulting from torque pulse exerted on the rotary member 2. As described, the rolling member 3 is guided by the guiding mechanism. Therefore, the rolling member 3 rolls on the rolling surface 5 without causing a slippage.

FIG. 4 illustrates a situation in that the oscillation angle of the rolling member 3 is 30 degree. As described, the weighted center g of the rolling member 3 is offset from the geometrical center 3a, and the curvature radius of the rolling surface 5 is entirely constant. Therefore, when the oscillation angle θ of the rolling member 3 is increased from zero to 30 degree as shown in FIG. 4, the curvature radius of the cycloid orbit traced by the weighted center g of the rolling member 3 thus rolling on the rolling surface 5 becomes gradually smaller with the increase in the oscillation angle θ thereof.

When the amplitude of the torsional vibration resulting from torque pulse exerted on the rotary member 2 is further increased, the oscillation angle θ of the rolling member 3 is further increased from the angle θ shown in FIG. 4.

FIG. 5 illustrates a situation in that the oscillation angle of the rolling member 3 is 45 degree. In this situation, the rolling member 3 further rolls on the rolling surface 5, and the curvature radius of the cycloid orbit traced by the weighted center g of the rolling member 3 becomes further smaller. Thus, since the weighted center g of the rolling member 3 is offset from the geometrical center 3a thereof, and the curvature radius of the rolling surface 5 is entirely constant, the weighted center g of the rolling member 3 is allowed to trace an elliptical cycloid orbit by a rolling motion of the rolling member 3.

As described, the length of the guide groove 9 is determined to restrict the oscillation angle θ of the rolling member 3 within the desired angle. Therefore, as shown in FIG. 5, the pin 8 attached to the rolling member 3 is stopped at both ends of the guide groove 9 when the rolling member 3 oscillates at the maximum angle thus restricted by the guide groove 9.

According to the dynamic damper 1 thus structured, the curvature of the cycloid orbit of the weighted center g of the rolling member 3 is increased in accordance with an amplification of the torsional vibrations resulting from torque pulse, that is, in accordance with an increase in the oscillation angle θ of the rolling member 3. In other words, the curvature radius of the cycloid orbit of the weighted center g of the rolling member 3 is decreased in accordance with an increase in the oscillation angle θ of the rolling member 3. Therefore, the weighted center g of the rolling member 3 is allowed to partially trace a particular elliptical orbit of a cycloid pendulum as indicated by a solid curved line C in FIGS. 3 to 5.

Specifically, according to the dynamic damper 1 of the present invention, the curvature of the rolling surface 5 is entirely constant, and the weighted center g of the rolling member is offset from the geometric center 3a thereof toward the center of the curvature 5a of the rolling surface 5. Therefore, the weighted center g of the rolling member 3 is allowed to partially trace a particular elliptical orbit of a cycloid pendulum by the rolling motion of the rolling member 3 in the housing 4. That is, the rolling member 3 is allowed to emulate a pendulum motion of the cycloid pendulum. For this reason, the oscillation frequency of the rolling member 3 per revolution can be determined without taking into consideration the oscillation angle θ thereof. According to the dynamic damper 1 thus structured, therefore, the number of oscillation of the rolling member 3 per revolution will not be deviated significantly from the designed number of oscillation per revolution even if the rolling member 3 is oscillated widely. In addition, the dynamic damper 1 is tuned to equalize the oscillation frequency of the rolling member 3 per revolution to the torque pulse frequency of the rotary member 2 per revolution. Therefore, the torsional vibrations exerted on the rotary member 2 can be attenuated stably by the rolling member 3 irrespective of the oscillation angle θ of the rolling member 3. Thus, the vibration damping performance of the dynamic damper can be improved by offsetting the weighted center g of the rolling member from the geometric center 3a thereby allowing the weighted center 3g to trace the particular orbit of the cycloid pendulum.

In addition, according to the dynamic damper 1 thus structured, a slippage between the rolling member 3 and the rolling surface 5 can be prevented by the guiding mechanism. Therefore, the rolling member 3 can be oscillated with the designed oscillation frequency per revolution. Moreover, the rolling member 3 can be kept in the radially outer side in the housing 4 by the guiding mechanism so that the inertia moment applied to the rolling member 3 can be increased. Further, the oscillation range of the rolling member 3 can be restricted within the desired range by adjusting the length of the guide groove 9.

Figure 6:
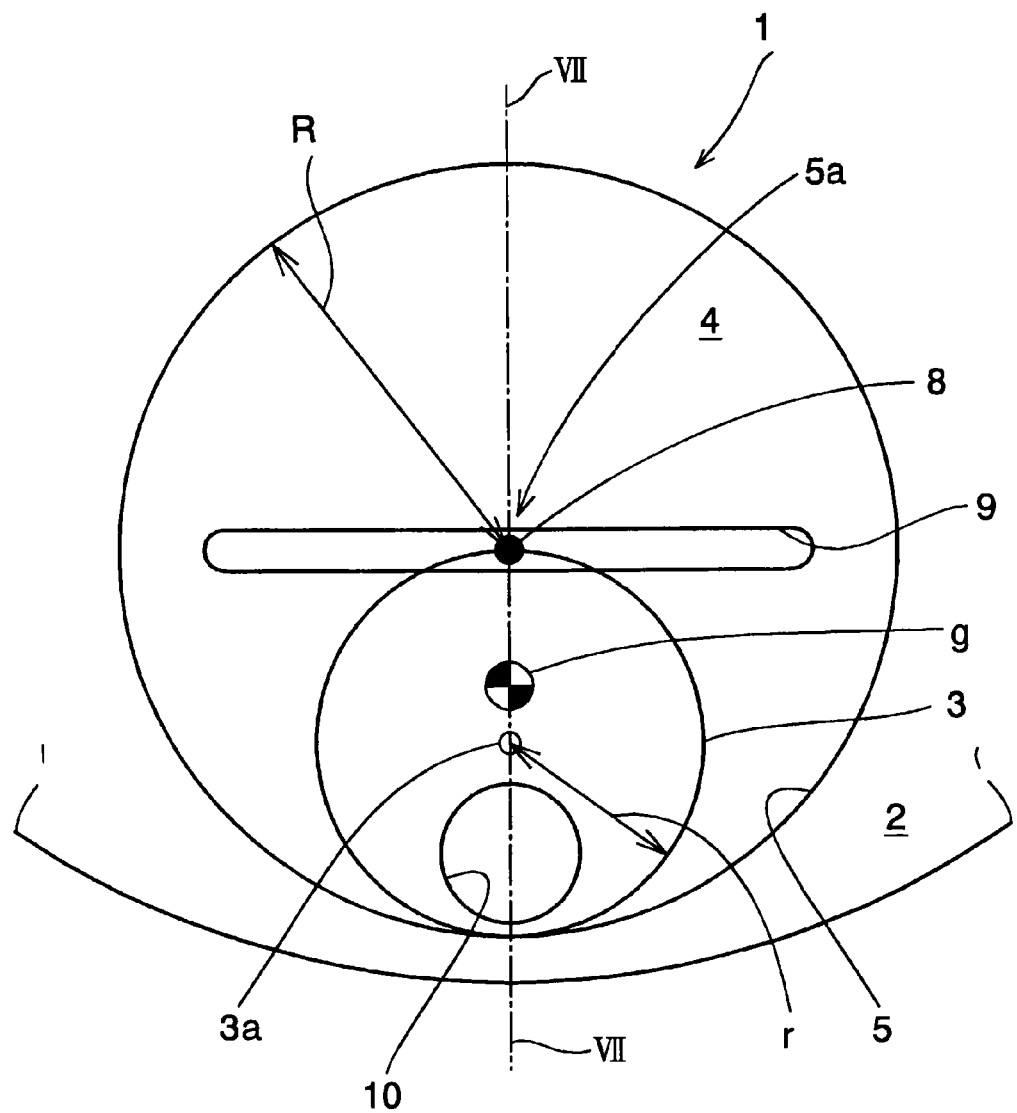
FIG. 6 is a front view showing a modified example of the rolling member shown in FIG. 1.
Figure 7:
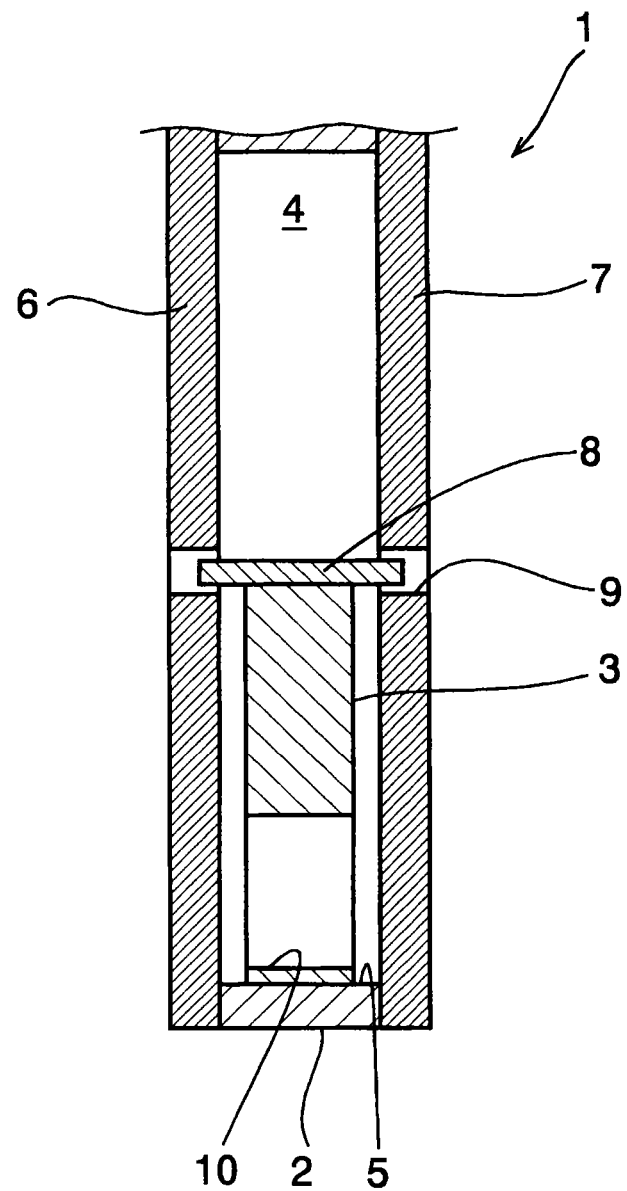
FIG. 7 is a cross-sectional view along VII-VII line shown in FIG. 6.

FIG. 6 illustrates a modification example of the rolling member 3 shown in FIG. 1, and FIG. 7 is a sectional view showing a cross-section along VII-VII line in FIG. 6. Specifically, in the example shown in FIGS. 6 and 7, the weighted center g of the rolling member 3 is offset from the geometric center 3a thereof by forming a hole 10 in the rolling member 3. In this example, the ratio of the outer diameter r of the rolling member 3 to the inner diameter R of the housing 4 is also set to 1:2, and an axis of the hole 10 in the rolling member 3 is parallel to the axis of the rolling member 3. As shown in FIG. 6, the hole 10 is formed into a circular shape, and a diameter thereof is shorter than the radius of the rolling member 3. In addition, as the example shown in FIG. 1, the pin 8 is attached to the outer circumference of the rolling member 3 in a manner to protrude in the axial direction, and the guide groove 9 to which the pin 8 is inserted loosely is formed on each of the inner face of the lid member 6 and 7 being opposed to the housing 4. Alternatively, the guide groove 9 may also be formed in a manner to penetrate through the lid members 6 and 7. By thus guiding the pin 8 by the guide groove 9, the rolling member 3 is allowed to roll on the rolling surface 5 without causing slippage.

According to the example shown in FIG. 6, the length of the guide groove 9 is also adjusted to restrict the oscillation range of the rolling member 3 within the desired range by stopping the pin 8 at both ends thereof. In addition, as the example shown in FIG. 1, the rolling member 3 is also kept in the radially outer side in the housing 4 by the guiding mechanism, and in case the oscillation angle θ of the rolling member 3 is zero, the weighted center g is situated closer to the center of curvature 5a of the rolling surface 5 than the geometric center 3a. Meanwhile, in order to offset the weighted center g of the rolling member 3 radially inwardly from the geometric center 3a, the through hole 10 is formed in the radially outside of the geometric center 3a. Therefore, the weighted center g of the rolling member 3 is allowed to partially trace the particular elliptical orbit of the cycloid pendulum by the rolling motion of the rolling member 3 in the housing 4. For this purpose, dimensions and location of the through hole 10 are determined based on an experimental result.

When the rotational speed of the rotary member 2 in which the dynamic damper 1 of this example is arranged is changed, or when the torque pulse is exerted on the rotary member 2, the rolling member 3 rolls on the rolling surface 5 in the direction opposite to the rotational direction of the rotary member 2. As described, a travelling distance of the rolling member 3, that is, the oscillation angle θ of the rolling member 3 is varied in accordance with an amplitude of the torsional vibration resulting from torque pulse exerted on the rotary member 2. In this situation, the curvature radius of the cycloid orbit traced by the weighted center g of the rolling member 3 becomes smaller in accordance with an increase in the oscillation angle θ of the rolling member 3, as illustrated in FIGS. 3 to 5. Therefore, the weighted center g of the rolling member 3 is allowed to partially trace the particular elliptical orbit of the cycloid pendulum by a rolling motion of the rolling member 3 also in this example.

Figure 8:
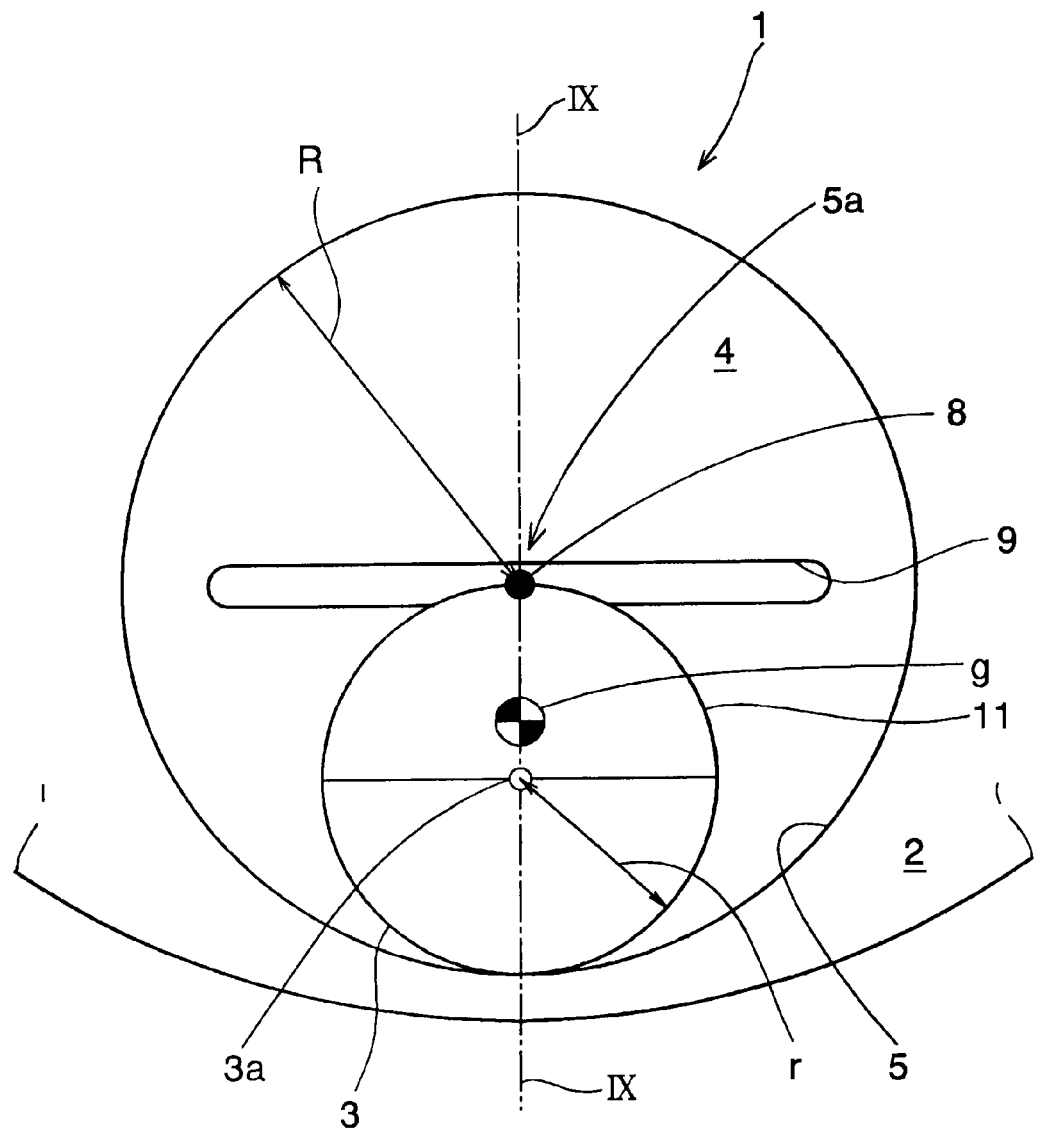
FIG. 8 is a front view showing a modified example of the rolling member shown in FIG. 6.
Figure 9:
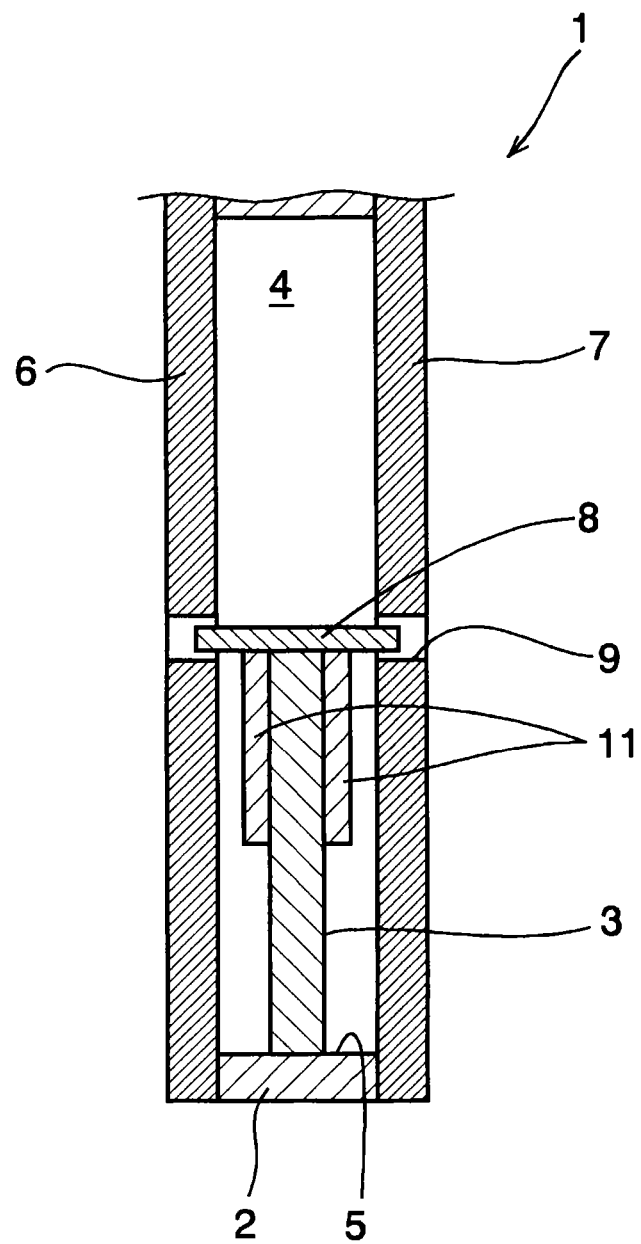
FIG. 9 is a cross-sectional view along IX-IX line shown in FIG. 8.

FIG. 8 illustrates a modification example of the rolling member 3 shown in FIG. 6, and FIG. 9 is a sectional view showing a cross-section along IX-IX line in FIG. 8. Specifically, in the example shown in FIGS. 8 and 9, the weighted center g of the rolling member 3 is offset from the geometric center 3a thereof by arranging a mass 11 on the rolling member 3 thereby differentiating weights in two areas of the rolling member 3 divided in the diametrical direction. In this example, the ratio of the outer diameter r of the rolling member 3 to the inner diameter R of the housing 4 is also set to 1:2, and the mass 11 is arranged in the radially inner area of the rolling member 3. According to the example shown in FIGS. 8 and 9, specifically, a semicircular mass 11 is arranged on radially inner area of each face of the rolling member 3 in parallel with the lid members 6 and 7.

In addition, the pin 8 is also attached to the outer circumference of the rolling member 3 in a manner to protrude in the axial direction, and the guide groove 9 to which the pin 8 is inserted loosely is formed on each of the inner face of the lid member 6 and 7 being opposed to the housing 4. Alternatively, the guide groove 9 may also be formed in a manner to penetrate through the lid members 6 and 7. By thus guiding the pin 8 by the guide groove 9, the rolling member 3 is allowed to roll on the rolling surface 5 without causing slippage. According to the example shown in FIG. 8, the length of the guide groove 9 is also adjusted to restrict the oscillation range of the rolling member 3 within the desired range by stopping the pin 8 at both ends thereof, and the rolling member 3 is also kept in the radially outer side in the housing 4 by the guiding mechanism.

As the example shown in FIG. 1, in case the oscillation angle θ of the rolling member 3 is zero, the weighted center g is situated closer to the center of curvature 5a of the rolling surface 5 than the geometric center 3a. According to the example shown in FIG. 8, in order to offset the weighted center g of the rolling member 3 radially inwardly from the geometric center 3a, the mass 11 is arranged on radially inner side of the rolling member 3. Therefore, the weighted center g of the rolling member 3 is allowed to partially trace the particular orbit of the cycloid pendulum by the rolling motion of the rolling member 3 in the housing 4. For this purpose, a shape, number, weight and so on of the mass 11 are determined based on an experimental result.

When the torsional vibration resulting from torque pulse is exerted on the rotary member 2 in which the dynamic damper 1 of this example is arranged, the rolling member 3 rolls on the rolling surface 5 in the direction opposite to the rotational direction of the rotary member 2. In this situation, the curvature radius of the cycloid orbit traced by the weighted center g of the rolling member 3 becomes smaller in accordance with an increase in the oscillation angle θ of the rolling member 3, as illustrated in FIGS. 3 to 5. Therefore, the weighted center g of the rolling member 3 is allowed to partially trace the particular elliptical orbit of the cycloid pendulum by a rolling motion of the rolling member 3 also in this example.

Figure 10:
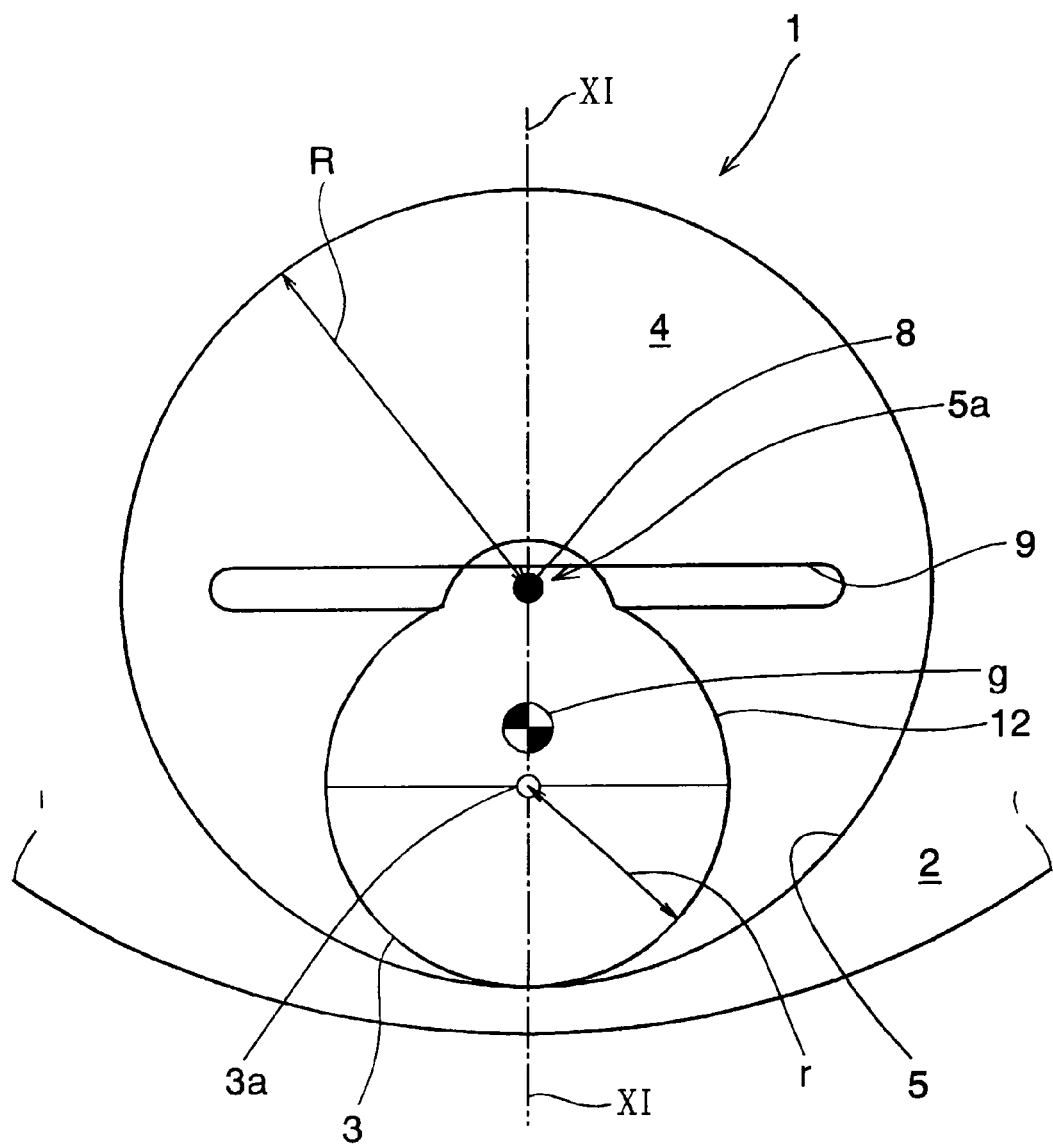
FIG. 10 is a front view showing a modified example of the rolling members shown in FIGS. 6 and 8.
Figure 11:
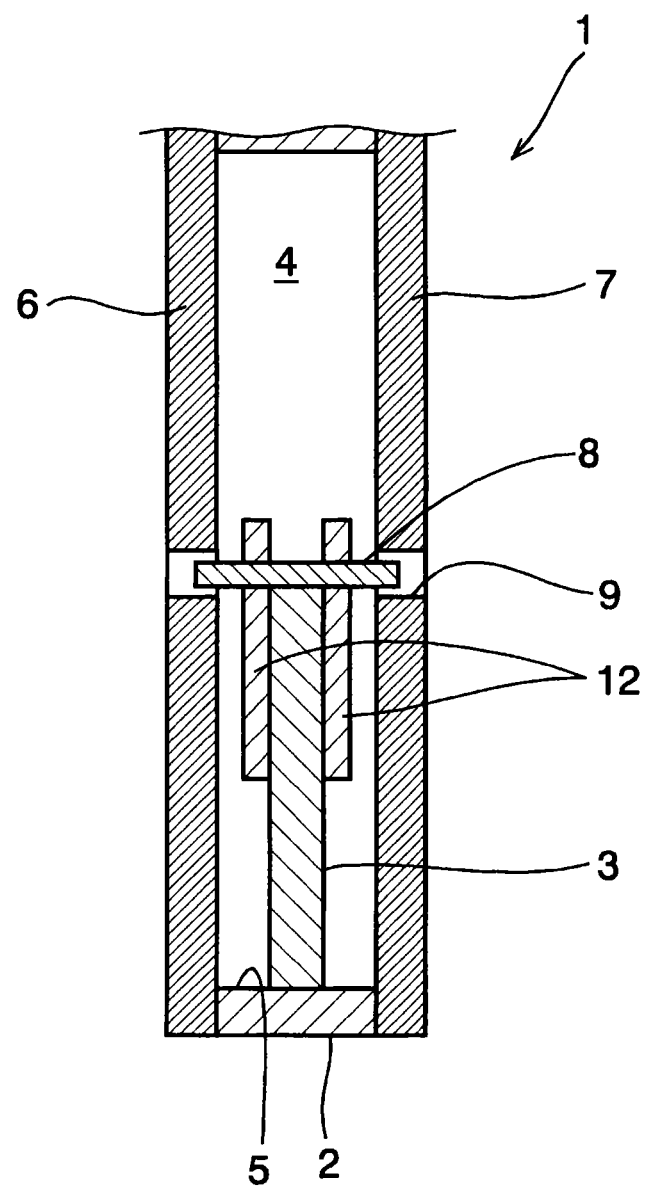
FIG. 11 is a cross-sectional view along XI-XI line shown in FIG. 10.

FIG. 10 illustrates a modification example of the rolling member 3 shown in FIGS. 6 and 8, and FIG. 11 is a sectional view showing a cross-section along XI-XI line in FIG. 10. Specifically, the example shown in FIGS. 10 and 11 is a modification of the mass used to offset the weighted center g of the rolling member 3 from the geometric center 3a thereof. According to the example shown in FIGS. 10 and 11, a semicircular shaped mass 12 having a protruding portion is arranged on radially inner area of the rolling member 3 situated at the outermost position. That is, as shown in FIG. 10, the mass 12 is partially protruded radially outwardly from the rolling member 3.

As the example shown in FIG. 1, in case the oscillation angle θ of the rolling member 3 to which the mass 12 is thus attached is zero, the weighted center g is also situated closer to the center of curvature 5a of the rolling surface 5 than the geometric center 3a. According to the example shown in FIG. 10, in order to offset the weighted center g of the rolling member 3 radially inwardly from the geometric center 3a, the mass 12 is thus arranged on the radially inner side of the rolling member 3. Therefore, the weighted center g of the rolling member 3 is allowed to partially trace the particular elliptical orbit of the cycloid pendulum by the rolling motion of the rolling member 3 in the housing 4. For this purpose, a shape, number, weight and so on of the mass 12 are determined based on an experimental result.

When the torsional vibration resulting from torque pulse is exerted on the rotary member 2 in which the dynamic damper 1 of this example is arranged, the rolling member 3 rolls on the rolling surface 5 whose curvature is entirely constant. In this situation, the curvature radius of the cycloid orbit traced by the weighted center g of the rolling member 3 becomes smaller in accordance with an increase in the oscillation angle θ of the rolling member 3, as illustrated in FIGS. 3 to 5. Therefore, the weighted center g of the rolling member 3 is allowed to partially trace the particular elliptical orbit of the cycloid pendulum by a rolling motion of the rolling member 3 also in this example.

Thus, according to the examples shown in FIGS. 6 to 11, the curvature of the rolling surface 5 is also entirely constant, and the weighted center g of the rolling member 3 is also offset from the geometric center 3a thereof toward the center of the curvature 5a of the rolling surface 5. Therefore, the weighted center g of the rolling member 3 is allowed to partially trace the particular elliptical orbit of the cycloid pendulum by the rolling motion of the rolling member 3 in the housing 4. That is, the rolling member 3 is allowed to emulate a pendulum motion of the cycloid pendulum. For this reason, the oscillation frequency of the rolling member 3 per revolution can be determined without taking into consideration the oscillation angle θ thereof. According to the dynamic damper 1 thus structured, therefore, the number of oscillation of the rolling member 3 per revolution will not be deviated significantly from the designed number of oscillation per revolution even if the rolling member 3 is oscillated widely. In addition, the dynamic damper 1 is tuned to equalize the oscillation frequency of the rolling member 3 per revolution to the torque pulse frequency of the rotary member 2 per revolution. Therefore, the torsional vibrations exerted on the rotary member 2 can be attenuated stably by the pendulum motion of the rolling member 3 irrespective of the oscillation angle θ of the rolling member 3. Thus, the vibration damping performance of the dynamic damper 1 can be improved by offsetting the weighted center g of the rolling member from the geometric center 3a thereby allowing the weighted center 3g to trace the particular elliptical orbit of the cycloid pendulum.

In addition, according to the examples shown in FIGS. 6 to 11, a slippage between the rolling member 3 and the rolling surface 5 can be prevented by the guiding mechanism. Therefore, the rolling member 3 can be oscillated with the designed oscillation frequency per revolution. Moreover, the rolling member 3 can be kept in the radially outer side in the housing 4 by the guiding mechanism so that the inertia moment applied to the rolling member 3 can be increased. Further, the oscillation range of the rolling member 3 can be restricted within the desired range by adjusting the length of the guide groove 9.

Figure 12:
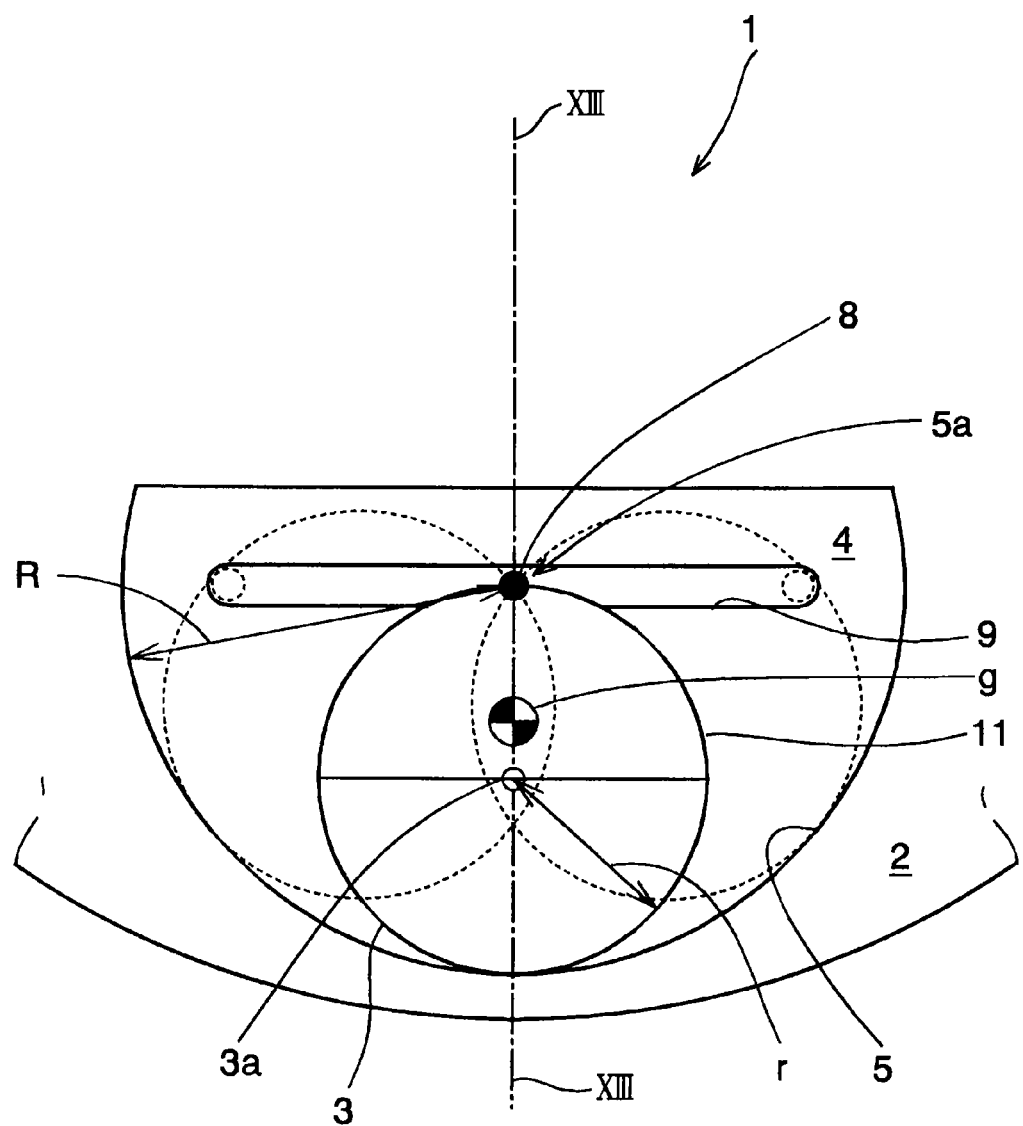
FIG. 12 is a front view showing a modified example of the housing shown in FIG. 1.
Figure 13:
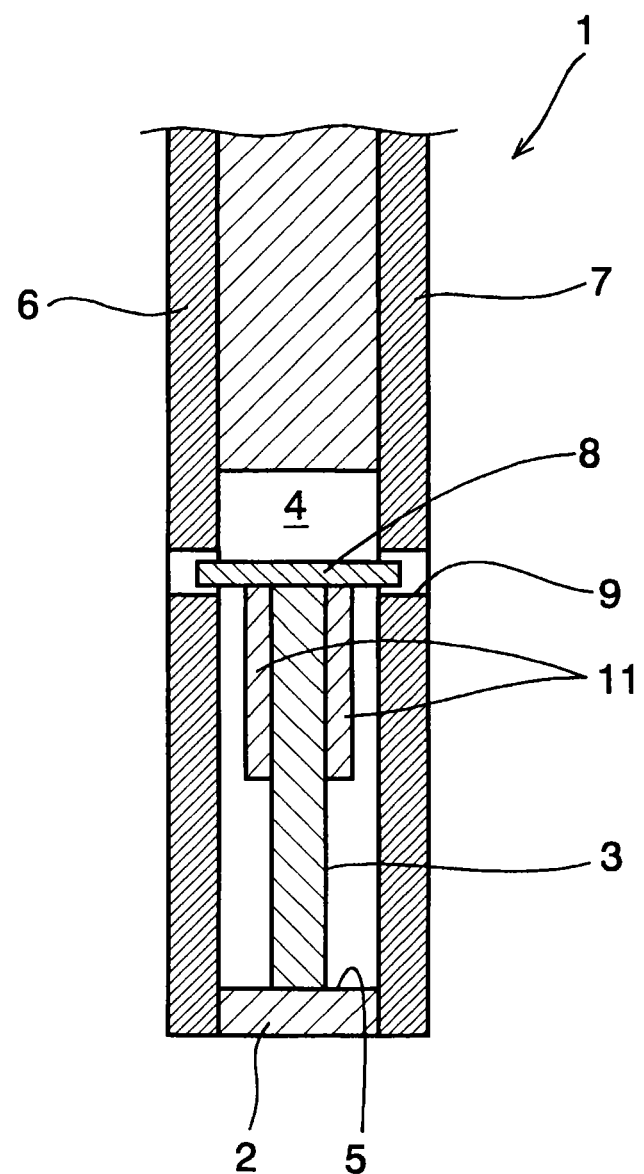
FIG. 13 is cross-sectional view along XII-XII line shown in FIG. 12.

FIG. 12 illustrates a modification example of the housing 4 shown in FIG. 1, and FIG. 13 is a sectional view showing a cross-section along XIII-XIII line in FIG. 12. As described, the dynamic damper 1 of the present invention is structured to attenuate the torsional vibrations of the rotary member 2 by the pendulum motion of the rolling member 3. As also described, when the rotational speed of the rotary member 2 is increased, the centrifugal force applied to the rolling member 3 is increased so that the rolling member 3 is moved radially outer side in the housing 4. Therefore, according to the example shown in FIG. 12, only a radially outer portion of the housing 4 is formed in the rotary member 2 within an oscillation range of the rolling member 3, and the remaining portion of the housing 4 is omitted.

As shown in FIG. 12, the curvature of the rolling surface 5 of the housing 4 is entirely constant and the ratio of a radius r of the rolling member 3 to the radius R of the housing 4 is 1:2. Also, the guiding mechanism is formed while passing though the center of curvature 5a of the rolling surface 5, in the direction perpendicular to the line passing through the rotational center of the rotary member 2 and the center of curvature 5a. However, according to the example shown in FIG. 12, a portion of the housing 4 in radially inner side of the guiding mechanism is omitted. Additionally, the mass 11 shown in FIG. 8 or the like may be arranged on the rolling member 3 also in this example.

As the example shown in FIG. 1, the pin 8 is also attached to the outer circumference of the rolling member 3 in a manner to protrude in the axial direction, and the guide groove 9 to which the pin 8 is inserted loosely is formed on each of the inner face of the lid member 6 and 7 being opposed to the housing 4. Alternatively, the guide groove 9 may also be formed in a manner to penetrate through the lid members 6 and 7. The length of the guide groove 9 is also adjusted to restrict the oscillation range of the rolling member 3 within the desired range by stopping the pin 8 at both ends thereof so that the rolling member 3 is kept in the radially outer side in the housing 4. In addition, in case the oscillation angle θ of the rolling member 3 is zero, the weighted center g is situated closer to the center of curvature 5a of the rolling surface 5 than the geometric center 3a.

When the torsional vibration resulting from torque pulse is exerted on the rotary member 2 in which the dynamic damper 1 of this example is arranged, the rolling member 3 rolls on the rolling surface 5 in the direction opposite to the rotational direction of the rotary member 2 within the range restricted by the guiding member. In this situation, the curvature radius of the cycloid orbit traced by the weighted center g of the rolling member 3 becomes smaller in accordance with an increase in the oscillation angle θ of the rolling member 3. Therefore, the weighted center g of the rolling member 3 is allowed to partially trace the particular elliptical orbit of the cycloid pendulum by a rolling motion of the rolling member 3 also in this example.

According to the example shown in FIGS. 12 and 13, therefore, the rolling member 3 can be kept in the radially outer side in the housing 4 by thus restricting the oscillation range of the rolling member 3 by the guising mechanism, and the housing 4 of the dynamic damper can be downsized. In addition, the oscillation frequency of the rolling member 3 per revolution will not be deviated significantly from the designed oscillation frequency per revolution even if the rolling member 3 is oscillated widely. Therefore, the torsional vibrations exerted on the rotary member 2 can be attenuated by the pendulum motion of the rolling member 3 irrespective of the oscillation angle θ of the rolling member 3. Thus, the vibration damping performance of the dynamic damper 1 can be improved by offsetting the weighted center g of the rolling member from the geometric center 3a thereby allowing the weighted center 3g to trace the particular elliptical orbit of the cycloid pendulum.

Figure 14:
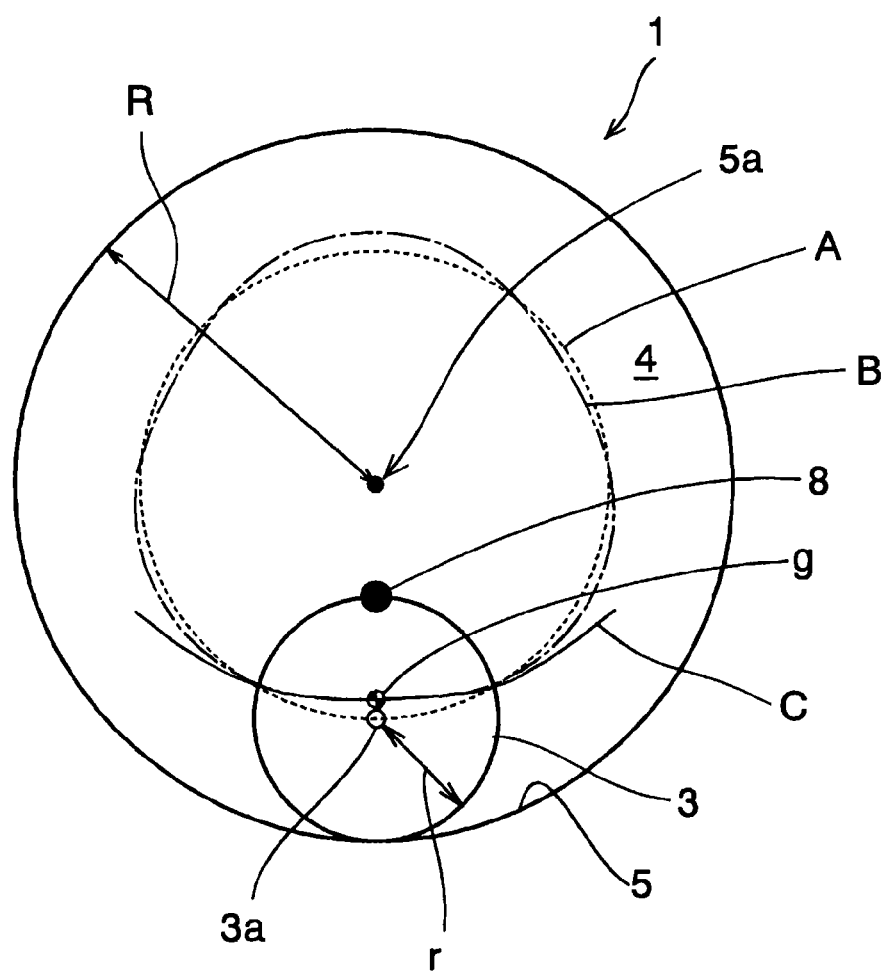
FIG. 14 a front view showing another example of the dynamic damper according to the present invention.

FIG. 14 shows another example of the dynamic damper according to the present invention in which the ratio of the outer diameter r of the rolling member 3 to the inner diameter R of the housing 4 is 1:3. As shown in FIG. 14, the curvature of the rolling surface 5 of the housing 4 is also constant entirely, and the rolling member 3 is also held on the housing 4 while being allowed to roll on the rolling surface 5. However, according to the example shown in FIG. 14, the ratio of the outer diameter r of the rolling member 3 to the inner diameter R of the housing 4 is 1:3.

As the example shown in FIG. 1, the pin 8 is attached to the outer circumference of the rolling member 3 in a manner to protrude in the axial direction. Although not especially shown in FIG. 14, an opening of the hollow hosing 4 is closed by lid members from both sides, and a guide groove to which the pin 8 is inserted loosely is also formed on each of an inner face of the lid members being opposed to the housing 4 along a hypocycloid of the pin 8. Alternatively, the guide groove may also be formed in a manner to penetrate through the lid members. Thus, in this example, the pin 8 and the guide groove also serves as the guiding mechanism. Therefore, the rolling member 3 is allowed to roll on the rolling surface 5 without causing slippage.

In this example, the weighted center g of the rolling member 3 is also eccentrically offset predetermined distance away from the geometric center 3a thereof. As described, the weighted center g can be offset from the geometric center 3a by arranging a mass at a desired portion of the rolling member 3, by cutting a portion of the rolling member 3, or by thickening a predetermined portion of the rolling member 3 while thinning a diametrically opposite portion. In addition, as the example shown in FIG. 1, the rolling member 3 thus structured is also kept in the radially outer side in the housing 4 by the guiding mechanism, and in case the oscillation angle θ of the rolling member 3 is zero, the weighted center g is situated closer to the center of curvature 5a of the rolling surface 5 than the geometric center 3a.

Specifically, the weighted center g of the rolling member 3 is offset from the geometric center 3a thereof in a manner to allow the weighted center g to partially trace the particular elliptical orbit of the cycloid pendulum by a rolling motion of the rolling member 3 along the rolling surface 5. For this purpose, a distance between the weighted center g and the geometric center 3a is determined based on an experimental result.

Next, an action of the dynamic damper according to the example shown in FIG. 14 will be explained hereinafter. In FIG. 14, a dashed-dotted line "B" represents a cycloid orbit of the weighted center g to be traced by rolling the rolling member 3 on the rolling surface 5. When the rotational speed of the rotary member 2 in which the dynamic damper 1 is arranged is changed, or when the torque pulse is exerted on the rotary member 2, the rolling member 3 rolls on the rolling surface 5 in the direction opposite to the rotational direction of the rotary member 2. As described, the weighted center g of the rolling member 3 is also eccentrically offset predetermined distance away from the geometric center 3a thereof. Therefore, the curvature radius of the cycloid orbit of the weighted center g of the rolling member 3 is decreased in accordance with an increase in the travelling distance of the rolling member 3 so that the weighted center g of the rolling member 3 is allowed to partially trace the particular elliptical orbit of the cycloid pendulum as indicated by a solid curved line C in FIG. 14.

Figure 15:
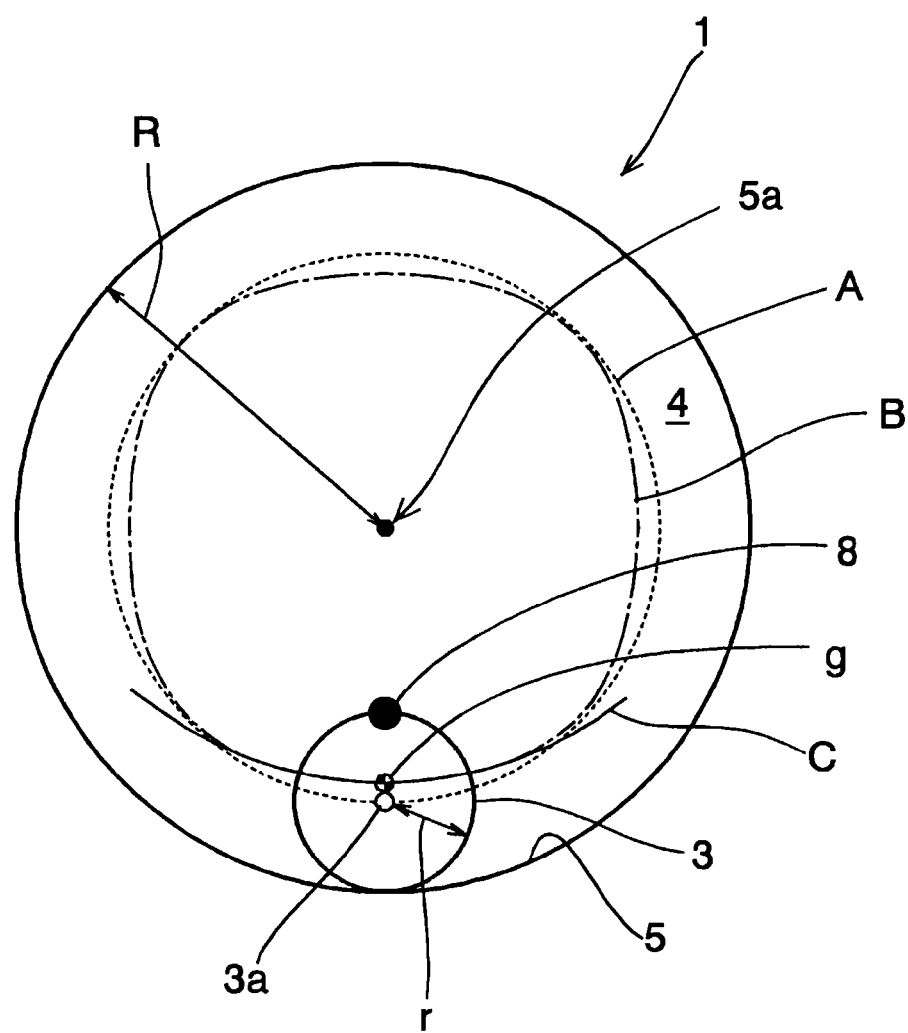
FIG. 15 a front view showing still another example of the dynamic damper according to the present invention.

FIG. 15 shows still another example of the dynamic damper according to the present invention in which the ratio of the outer diameter r of the rolling member 3 to the inner diameter R of the housing 4 is 1:4. As shown in FIG. 15, the curvature of the rolling surface 5 of the housing 4 is also constant entirely, and the rolling member 3 is also held on the housing 4 while being allowed to roll on the rolling surface 5. However, according to the example shown in FIG. 15, the ratio of the outer diameter r of the rolling member 3 to the inner diameter R of the housing 4 is 1:4.

As the example shown in FIG. 1, the pin 8 is attached to the outer circumference of the rolling member 3 in a manner to protrude in the axial direction. Although not especially shown in FIG. 15, an opening of the hollow hosing 4 is closed by lid members from both sides, and a guide groove to which the pin 8 is inserted loosely is also formed on each of an inner face of the lid members being opposed to the housing 4 along a hypocycloid of the pin 8. Alternatively, the guide groove may also be formed in a manner to penetrate through the lid members. Thus, in this example, the pin 8 and the guide groove also serves as the guiding mechanism. Therefore, the rolling member 3 is allowed to roll on the rolling surface 5 without causing slippage.

In this example, the weighted center g of the rolling member 3 is also eccentrically offset predetermined distance away from the geometric center 3a thereof. As described, the weighted center g can be offset from the geometric center 3a by arranging a mass at a desired portion of the rolling member 3, by cutting a portion of the rolling member 3, or by thickening a predetermined portion of the rolling member 3 while thinning a diametrically opposite portion. In addition, as the example shown in FIG. 1, the rolling member 3 thus structured is also kept in the radially outer side in the housing 4 by the guiding mechanism, and in case the oscillation angle θ of the rolling member 3 is zero, the weighted center g is situated closer to the center of curvature 5a of the rolling surface 5 than the geometric center 3a.

Specifically, the weighted center g of the rolling member 3 is offset from the geometric center 3a thereof in a manner to allow the weighted center g to partially trace the particular elliptical orbit of the cycloid pendulum by a rolling motion of the rolling member 3 along the rolling surface 5. For this purpose, a distance between the weighted center g and the geometric center 3a is determined based on an experimental result.

Next, an action of the dynamic damper according to the example shown in FIG. 15 will be explained hereinafter. In FIG. 15, a dashed-dotted line "B" represents a cycloid orbit of the weighted center g to be traced by rolling the rolling member 3 on the rolling surface 5. When the rotational speed of the rotary member 2 in which the dynamic damper 1 is arranged is changed, or when the torque pulse is exerted on the rotary member 2, the rolling member 3 rolls on the rolling surface 5 in the direction opposite to the rotational direction of the rotary member 2. As described, the weighted center g of the rolling member 3 is also eccentrically offset predetermined distance away from the geometric center 3a thereof. Therefore, the curvature radius of the cycloid orbit of the weighted center g of the rolling member 3 is decreased in accordance with an increase in the travelling distance of the rolling member 3 so that the weighted center g of the rolling member 3 is allowed to partially trace the particular elliptical orbit of the cycloid pendulum as indicated by a solid curved line C in FIG. 15.

Thus, according to the examples shown in FIGS. 14 and 15, the curvature of the rolling surface 5 is also entirely constant, and the weighted center g of the rolling member is also offset from the geometric center 3a thereof toward the center of the curvature 5a of the rolling surface 5. Therefore, the weighted center g of the rolling member 3 is allowed to partially trace the particular elliptical orbit of the cycloid pendulum by the rolling motion of the rolling member 3 in the housing 4, as indicated by the solid curved line C in FIGS. 14 and 15. That is, the rolling member 3 is allowed to emulate a pendulum motion of the cycloid pendulum. For this reason, the oscillation frequency of the rolling member 3 per revolution can be determined without taking into consideration the oscillation angle θ thereof. According to the dynamic damper 1 thus structured, therefore, the number of oscillation of the rolling member 3 per revolution will not be deviated significantly from the designed number of oscillation per revolution even if the rolling member 3 is oscillated widely. In addition, the dynamic damper 1 is tuned to equalize the oscillation frequency of the rolling member 3 per revolution to the torque pulse frequency of the rotary member 2 per revolution. Therefore, the torsional vibrations exerted on the rotary member 2 can be attenuated stably by the pendulum motion of the rolling member 3 irrespective of the oscillation angle θ of the rolling member 3. Thus, the vibration damping performance of the dynamic damper 1 can be improved by offsetting the weighted center g of the rolling member from the geometric center 3a thereby allowing the weighted center 3g to trace the particular elliptical orbit of the cycloid pendulum.

In addition, according to the examples shown in FIGS. 14 and 15, a slippage between the rolling member 3 and the rolling surface 5 can also be prevented by the guiding mechanism. Therefore, the rolling member 3 can be oscillated with the designed oscillation frequency per revolution. Moreover, the rolling member 3 can also be kept in the radially outer side in the housing 4 by the guiding mechanism so that the inertia moment applied to the rolling member 3 can also be increased. Further, the oscillation range of the rolling member 3 can also be restricted within the desired range by adjusting the length of the guide groove 9.

Thus, according to the present invention, the weighted center of the rolling member is offset from the geometric center thereof, and the curvature of the rolling surface is entirely constant. Therefore, the weighted center of the rolling member is allowed to partially trace the particular elliptical orbit of the cycloid pendulum by rolling the rolling member on the rolling surface. For this reason, the torsional vibrations exerted on the rotary member resulting from torque pulse can be attenuated irrespective of the oscillation angle of the rolling member.

In other words, the oscillation frequency per revolution of the rolling member will not deviate from the designed oscillation frequency per revolution even if the rolling member is oscillated widely. This means that the rolling member of the present invention is adapted to emulate a pendulum motion of the cycloid pendulum. Therefore, the torsional vibrations of the rotary member can be attenuated stably. In addition, the rolling member can be kept in the radially outer side in the housing, and the oscillation range can be restricted within the desired range by adjusting the length of the guide member. Therefore, the dynamic damper according to the present invention can be downsized.

The invention claimed is:

1. A dynamic damper, comprising;
a housing, which is formed in a rotary member;
a rolling surface, which is formed on an inner surface of the housing;
a rolling member, which is held in the housing in a manner to be rolled on the rolling surface by torque pulse exerted on the rotary member;
a lid member which covers an opening of the housing; and
a guiding mechanism that guides the rolling member to roll on the rolling surface;
wherein:
the housing is formed into a cylindrical shape that is parallel to the axis of the rolling member;
a curvature of the rolling surface is entirely constant;
a cross-section of the rolling member is a circular shape whose curvature radius is smaller than that of the rolling surface;
a weighted center of the rolling member is offset from a geometric center thereof in a manner to be situated between a center of curvature of the rolling surface and the geometric center of the rolling member, situated at a neutral position; and
wherein the guiding mechanism includes:
a pin protruding axially which is attached to an outer circumferential edge of the rolling member, and
a guide groove which is formed on the lid member along a hypocycloid of the pin perpendicular to a line passing through the center of curvature of the rolling surface and the geometric center of the rolling member situated at the neutral position.

2. A dynamic damper, comprising;
a housing, which is formed in a rotary member;
a rolling surface, which is formed on an inner surface of the housing;
a rolling member, which is held in the housing in a manner to be rolled on the rolling surface by torque pulse exerted on the rotary member;
a lid member which covers an opening of the housing; and
a guiding mechanism that guides the rolling member to roll on the rolling surface;
wherein:
the housing is formed into a cylindrical shape that is parallel to the axis of the rolling member;
a ratio of an outer diameter of the rolling member to an inner diameter of the housing is 1:2;
a weighted center of the rolling member is offset from a geometric center of the rolling member in a manner to be situated between a center of curvature of the rolling surface and the geometric center of the rolling member, situated at a neutral position; and
wherein the guiding mechanism includes:
a pin protruding axially which is attached to an outer circumferential edge of the rolling member, and
a guide groove which is formed on the lid member along a hypocycloid of the pin perpendicular to a line passing through the center of curvature of the rolling surface and the geometric center of the rolling member situated at the neutral position.

* * * * *